United States Patent [19]

Constant

[11] Patent Number: 5,793,880
[45] Date of Patent: Aug. 11, 1998

[54] FREE SPACE IMAGE COMMUNICATION SYSTEM AND METHOD

[75] Inventor: Robert N. Constant, Rancho Palos Verdes, Calif.

[73] Assignee: The Aerospace Corporation, El Segundo, Calif.

[21] Appl. No.: 644,439

[22] Filed: May 13, 1996

[51] Int. Cl.$^6$ ....................................... G06K 9/00
[52] U.S. Cl. .................. 382/100; 359/154; 340/815.4
[58] Field of Search .................... 382/100, 181, 382/182, 232, 325; 340/815.4, 815.45, 815.53, 815.63; 341/13, 175; 359/154; 380/49, 54, 59; 116/18

[56] References Cited

U.S. PATENT DOCUMENTS 5,418,630  5/1995  Mori et al. .......................... 358/472
5,602,932  2/1997  Macdonald et al. .................. 382/100
5,617,235  4/1997  Abrahamson ........................ 359/142

*Primary Examiner*—Andrew W. Johns
*Attorney, Agent, or Firm*—Derrick Michael Reid

[57] ABSTRACT

A communication system including a transmitter and receiver, encodes a data set into a pixelized image for display and projection transmission through free space to a receiving camera regenerating the pixelized image which is then decoded back into the data set, the image transmission increases data transmission rates over serial bit free space communication by coding an entire data set into one pixelized image matched to one of several image patterns to which the data set may be coded using various image coding schemes, as examples, hexadecimal, angular and symbolic image coding schemes are particularly disclosed.

17 Claims, 4 Drawing Sheets

Free Space Image Communication System

Free Space Image Communication System

|       | $B_3$ | $B_2$ | $B_1$ | $B_0$ |       |       |      |
|-------|-------|-------|-------|-------|-------|-------|------|
|       |       |       |       |       | $A_0$ |       | 0000 |
|       |       | ▨     |       |       | $A_1$ | $t_0$ | 0100 |
|       |       |       | ▨     | ▨     | $A_2$ |       | 0011 |
|       | ▨     |       |       | ▨     | $A_3$ |       | 1001 |

|       | $B_3$ | $B_2$ | $B_1$ | $B_0$ |       |       |      |
|-------|-------|-------|-------|-------|-------|-------|------|
|       |       | ▨     | ▨     |       | $A_0$ |       | 0110 |
|       |       | ▨     |       | ▨     | $A_1$ | $t_1$ | 0101 |
|       | ▨     | ▨     | ▨     | ▨     | $A_2$ |       | 1111 |
|       | ▨     | ▨     |       |       | $A_3$ |       | 1100 |

|       | $B_3$ | $B_2$ | $B_1$ | $B_0$ |       |       |      |
|-------|-------|-------|-------|-------|-------|-------|------|
|       |       | ▨     | ▨     | ▨     | $A_0$ |       | 0111 |
|       | ▨     | ▨     | ▨     |       | $A_1$ | $t_2$ | 1110 |
|       |       |       |       | ▨     | $A_2$ |       | 0001 |
|       |       |       | ▨     |       | $A_3$ |       | 0010 |

|       | $B_3$ | $B_2$ | $B_1$ | $B_0$ |       |       |      |
|-------|-------|-------|-------|-------|-------|-------|------|
|       | ▨     |       |       |       | $A_0$ |       | 1000 |
|       | ▨     |       | ▨     |       | $A_1$ | $t_3$ | 1010 |
|       | ▨     |       |       | ▨     | $A_2$ |       | 1001 |
|       | ▨     |       | ▨     | ▨     | $A_3$ |       | 1011 |

Hexadecimal Image Coding

FIG. 2 t0      100 t1      000 t2      111 t3      101

Angular Image Coding

000 Square      100 Rhombus

001 Triangle    101 Rectangle

010 Circle      110 Trapezoid

011 Parallelogram    111 Semi-Circle $t_0$     001010011

$t_1$     101110100

$t_2$     111011010

$t_2$     000001110

Symbolic Image Coding

FREE SPACE IMAGE COMMUNICATION SYSTEM AND METHOD

STATEMENT OF GOVERNMENT INTEREST

The invention was made with Government support under Contract No. F04701-93-C-0094 by the Department of the Air Force. The Government has certain rights in the invention.

The invention described herein may be manufactured and used by and for the government of the United States for governmental purpose without payment of royalty therefor.

SPECIFICATION

STATEMENT OF RELATED APPLICATION

The present patent application is related to assignee's copending application 08/561,343, filed: Nov. 21, 1995, entitled Free Space Star-Coupled Optical Data Bus.

FIELD OF THE INVENTION

The present invention relates to the field of optical communication. More particularly, the present invention to the communication of data over free space using image transmitters and receivers.

BACKGROUND OF THE INVENTION

The use of optical transmitters and receivers have been used to transfer data over free space. For example, surveillance satellites take a picture of the earth and extract information such as crop types, missile types, points of launch and missile trajectories. These pictures are encoded and transmitted in serial data stream to ground stations. Optical communication systems eliminate the need for wires or optical fibers between transmitters and receivers. Certain optical communication applications include communication systems where high data transfer rates are required. One problem with existing optical communication systems, such as those using laser light beams in which serial data is communication, is the need for accurate alignment between the transmitter and receivers. Another inherent problem with optical communication systems is that data is transmitted serially through an optical beam. Serial data transmission is rate limited by the amount of time required to transmit a bit of data.

Optical transmission is preferred to cable transmission. Computers could communicate without interconnecting cables. In a application, a launch vehicle cable is connected to ground control through copper wires or optical fibers which are heavy communication cables which create problems during lift-off. These cables could be replaced with a free space communication path to transmit the data. The free space communication path eliminates heavy cable release problems prior to lift-off. Laser beams could be used as a free space communication means, but the lasers require accurate beam alignment, and the use of serial data streams.

Communication systems transfer digital bit streams in serial or parallel fashion. A wire, optical fiber or free space optical path are used as transmission media. Several paths may be grouped in parallel to increase the data transmission rate, each path transmitting serial data in parallel to each other. In those applications where free space is used as the communication media, there may be interference between parallel optical paths limiting data rates. Parallel optical paths also require duplicative transmitting and receiving hardware increasing the complexity and cost of the communication system. These and other disadvantages are solved or reduced using the present invention.

SUMMARY OF THE INVENTION

An object of this invention is to provide a system and method for transmitting data over free space.

Another object of this invention is to provide a system and method for transmitting a data set encoded into an optical image.

Yet another object of the present invention is to increase the speed of the transmission of data over free space.

Still another object of the present invention is to generate and project an image encoded with data information and transmitted over a free space communication path.

Still a further object of the invention is to transmit digital data without wires or fibers between two or more electronic pieces of equipment.

The present invention covers a system and method for transmitting a data set encoded into a displayed image projected through free space. The invention is a system and related method of transmitting data using a picture to simultaneously communicate a plurality of data bits encoded as a graphical image transmitted over an optical path. In the preferred form, the invention is a combination of an encoder and optical image display means at a transmitting end, and a receiving camera and decoder at the receiver end. With this combination, information can be transferred between the transmitter and receiver at increased data rates. The data to be communicated over free space is first collected as a data set and encoded into an image which is then projected by a projection means through free space and received by a receiving means, and then decoded back into the data set. The decoding means may employ image recognition to aid in the reconstruction the transmitted image. Differing coding formats, such as the preferred hexadecimal, angular or symbolic coding formats may be used. A plurality of data bits can be transmitted over free space within a single image sampling time so as to increase the speed of free space data communication.

The invention transfers data without wires by transmitting an image stream or sequential pictures rather than serial or parallel data streams. The invention comprises a transmitter means and a receiving means between which is the free space communication media. The transmitter means preferably includes an electronic encoding processing means for encoding data into an image and a display means such as a flat panel display, video screen, or other suitable means to display an image of data projected into free space. The receiver means includes an optical receiver such as a CCD camera, or photodetector array for receiving and viewing the image without wires and preferably includes a data processing decoding means which processes the image to decode the image back into the original data set. In the preferred form, a set of stored image patterns are used to encode and decode the image from the data set. The use of optical images eliminates RF emissions and interference. The present invention has the ability to encode data using symbolic images as a security measure to prevent unauthorized reception of communicated data. The advantages of the present invention include the elimination of wires or optical fibers or duplicative hardware as with parallel communication paths, increases the data rates over serial data transfers, and reduces alignment constraints associated with laser transmitters and receivers. These and other advantages will become more apparent from the following detailed description of the preferred embodiment.

BRIEF DESCRIPTION OF THE DRAWINGS

FIG. 2 is a diagram depicting an exemplar hexadecimal image coding of data for free space image communication.

DETAILED DESCRIPTION OF THE PREFERRED EMBODIMENT

Figure 1:
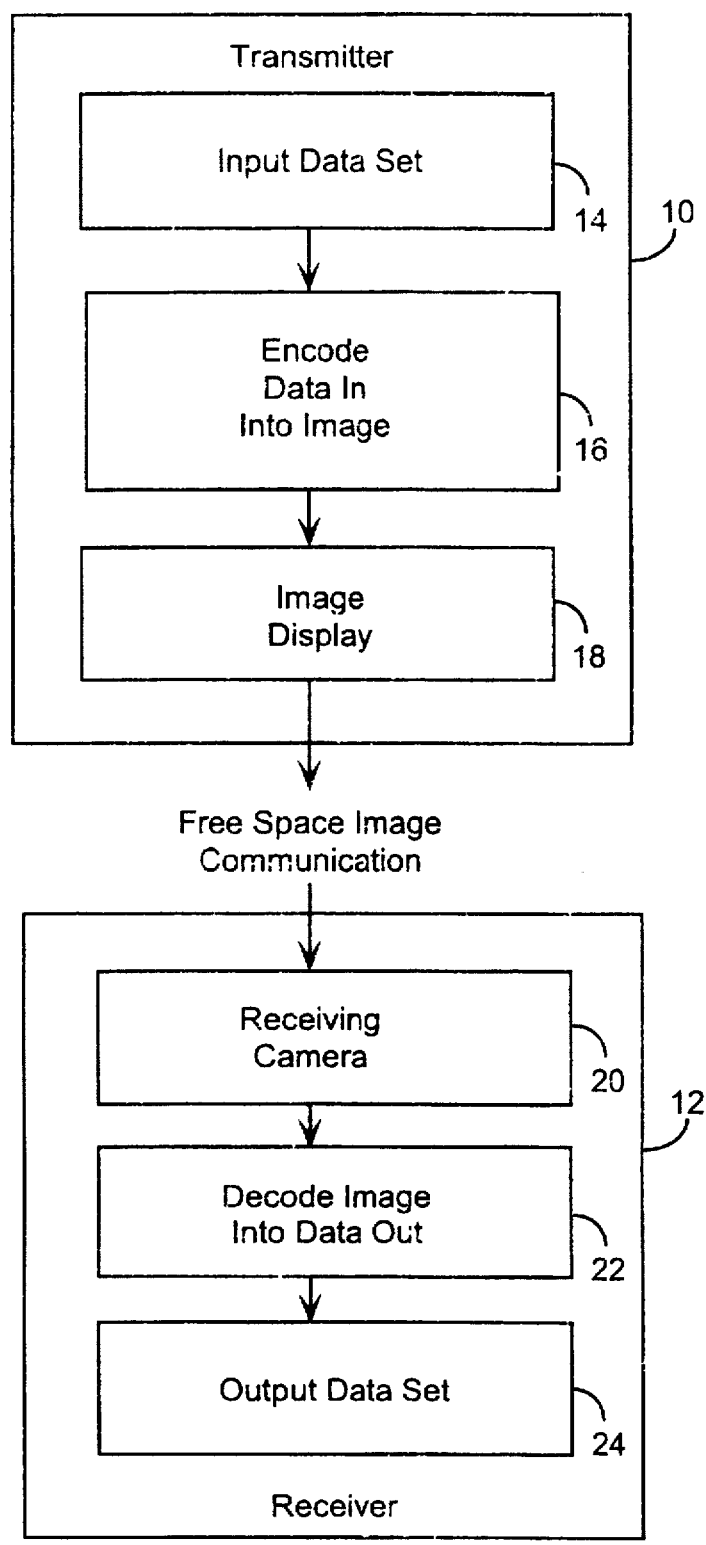
FIG. 1 is a block diagram of a free space image communication system.

An embodiment of the present invention is described with reference is to the figures using reference designations as shown in the figures. Referring to FIG. 1, the configuration of the free space communication system consists of at least a transmitter 10 and a receiver 12 for communicating an image over free space. The transmitted displayed image equivalently could be reflected by mirrors or any other suitable redirection means, such as a bundle of optic fibers, not shown, to redirect the displayed image to the receiver 12. The transmitter 10 operates upon an input means 14 providing an input data set of data to be communicated. The transmitter 10 includes an encoder means 16 for encoding the digital binary data set by transforming the data set into a symbolic or graphical image. To transmit a digital image data, the input data set is inputted into the encoder 16 which transforms the data set into an image picture, preferably a two dimensional electronic array of pixels. Many different encoding schemes can be used. A one dimensional array could be used. The preferred two dimensional array of encoded data is then applied to a visual display means 18 for external viewing and projection into free space. The optical spectrum of the display image is preferably in the visual spectrum, although another spectrum, such as the infrared spectrum, could be used as well. The image is displayed by the display means 18 which projects the image into free space disposed between the transmitter 10 and receiver 12. The receiver 12 includes an optical receiver 20 which may be a receiving camera, such as CCD video camera, which will receive the displayed image and reconstruct the displayed image into a received image. The receiver 12 decodes the image into the data set identical to the input data set received which was encoded 16 into the displayed image 18. The receiver 12 includes a decoder 22 which decodes the received image into an output data set communicated to an output means 24. The output data set contains the same data as the input data set which is communicated over free space without the need for wires or optical fibers. The effective data rate may be increased by the number data bits encoded in each image when each image is transmitted at a given clock rate.

Referring to all of the figures, binary digital data can be encoded into one of many possible encoding schemes, including hexadecimal, angular and symbolic representation. For example, using hexadecimal image encoding, an image includes 16 predefined display bits. Each of the sixteen areas corresponds to one or more pixels of a displayed image. The displayed image is communicated at one sampling time (t) such that all sixteen areas, that is, all sixteen bits are communicated simultaneously. In the exemplar hexadecimal image coding shown in FIG. 2, each image includes 16 display areas defined by the B0-3 by A0-3 two dimensional array and each display is coded to sixteen bits. An operation may include the display of only an array, such as one of the four horizontal arrays A0-A3, shown in FIG. 2. The arrays A0-A4, each have four light or dark rectangles for respective data bits B0-B3. The B0-3 indicators may correspond to weighted binary bits B0 is one, B1 is two, B2 is four and B3 is eight. Each array A0-3 corresponding to hexadecimal value. The entire image corresponds to four hexadecimal values. For example, at t1, A1 the bit 0101 corresponds to the hexadecimal value of five corresponding to a bit pattern of 0101. With four bits B0-B3 per array A0-A3, combination of 16 patterns exists for each timed display t0-t3. The receiver 20 matches each received pattern with one of 65,536 stored patterns to decode the image to a data set of sixteen bits. Once a match is found by the decoder means 22, the appropriate sixteen bit pattern is generated as at output data set 24. Four images and respective sampling times t0, t1, t2 and t3 are shown in FIG. 2. During the four sampling times, t0-t3, four images are communicated transferring sixty-four data bits. While the display image is considered a sequential hexadecimal image, those skilled in art recognized that the image is more simply considered a horizontal-vertical checker board of binary bits e.g. sixteen bits, communicated simultaneously as one image in a sequence of images t0-4.

At the receiver 12, the camera 20 will detect the transmitted image, and preferably communicate the received image as pixelized electronic data to the decoder 22, which is preferably a processing programmed computer which will match the receive image to a stored image corresponding and mapped to a pattern of data bits. The computer preferably stores known image patterns in memory and matches the received pixelized electronic data to the stored image pattern to determine the transmitted bits. The computer preferably stores maps, one for each possible image pattern. Alternatively, computer-executed algorithms that process electronic pixelized data images, read each image area of the pixelized data image for the received image to determine the presence of a bit or bit pattern to then reconstruct the entire data set. Likewise, the encoder 16 could also be a computer generating a pattern of bit areas of the image without the use of stored images. The input data set that was encoded and transmitted as an image is thus reconstructed into a receive image and assigned to an output data set which matches or is correlated to the input data set. The image data is preferrable to a two dimensional array BxA, but a linear array of B bits could also be used.

Conventional computational techniques will determine which bit pattern matches the receive pixelized electronic data. Due to optical imperfections, pixelized electronic data may not exactly match a given bit pattern. For example, when more than half of the pixels within an image area are on or exceed a threshold level, the computer assigns that area to a binary one. This is a simple processing technique to reconstruct the optically received electronic pixelized data into a recognized pattern which is then assigned a plurality of digital bits. Various optical reception and companion pattern recognition techniques can be used to match electronic pixelized data to digital data. Those skilled in the art can design such systems and use such pattern recognition techniques.

The transmitter 10 comprises an encoding means 14 to encode 16 input data set into an image. The encoder 16 could be implemented using any microprocessor such as a Harris 80C286/883 static 16 bit microprocessor along with solid state random access memory (RAM) such as the Harris HM-6561/883 256×4 synchronous RAM. The microprocessor and RAM combined as a conventional microcomputer. The input data set 14 to be transmitted is acquired by the microcomputer, and software in the microcomputer transforms the input data set into a digital image representation and the image may be temporarily stored in RAM for subsequent display and transmission. The microcomputer then outputs the digital image onto the display means 18. The display means 18 can be of several types, such as an array of light emitting diodes (LED), a Cathode Ray Tube (CRT) video display such as is used in personal computers, a fluorescent tube display manufactured by Industrial Electronic Engineers, Inc., a bar display such as a Hewlett-Packard HLMP-2620, or a liquid crystal display (LCD) such as those used in Casio digital wrist watches. The display means 18 will typically comprise an illumination means generating an illuminated pixelized image having a predetermined pattern and a projection means, such as a lens, for projecting the pixelized image into and through free space towards the receiving means 20. Those skilled in the art know how to design microcomputer systems for encoding data into an image for display.

The receiving camera 20 may be one of several types. Typically, the camera 20 will include a focusing means and a photodetector means, both not shown. The camera 20 may be an electronic camera such as a charge coupled device (CCD) or a video camera such as those made by Sony, Hitachi, Phillips, and others. The camera 20 may be of conventional type such as those used in automated inspection systems, and enhanced with pattern recognition capabilities. The image picture received by the camera 20 is either in digital form, such as that made by Vision Research model Phantom V2.0, or in analog form which needs to be digitized by an analog to digital converter such as that made by Micro Networks model MN5249. The digitized data from the camera 20 is communicated to a decoding means 22 which decodes the image data into the output data set 24. The decoding means 22 could be a microcomputer such as the one described for the encoding means 16 also having the microprocessor and the associated RAM. The software in the microcomputer matches or correlates the received image pictures to stored patterns in the RAM storing replicas of the displayed image such as those shown in FIGS. 2-4. The software in the receiving decoding means 22 perform functions similar to those done in image processing, including pattern recognition and data correlation. To facilitate matching, the received images could be rotated, translated, enlarged, reduced, and edge/contrast enhanced for improved image recognition. When a match of the receive image to a data set is found, the corresponding digital output data set is generated 24.

Figure 3:
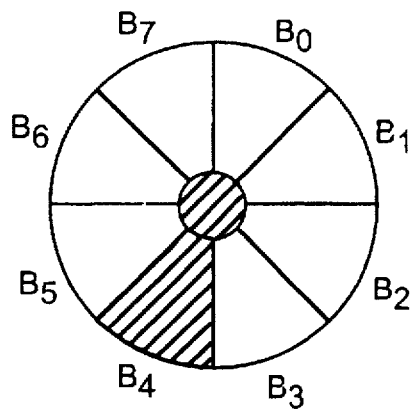
FIG. 3 is a diagram depicting an angular image coding of data for free space image communication.
Figure 3:
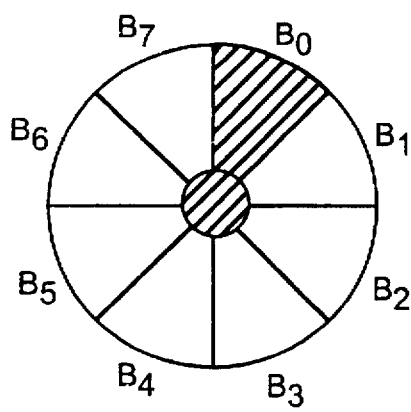
Figure 3:
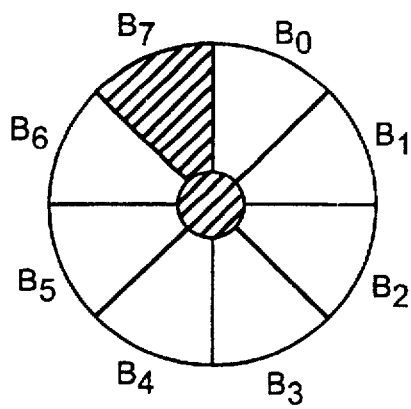
Figure 3:
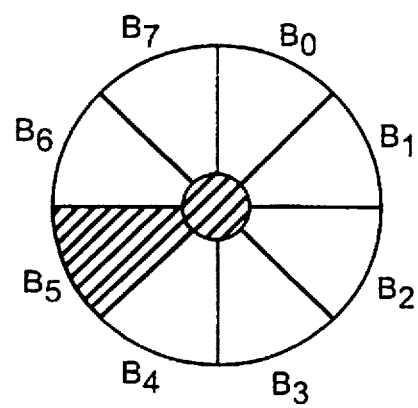

FIG. 3 shown another coding example referred to as an angular image coding scheme where a set of image patterns is a set of angular areas within a circular display having eight equiangular display areas. A center circular area is used to derive a self clocking signal when a sequence of images is transferred. Each angular area B0-B7 is mapped to a set of three data bits. Four sampling times t0-3 are shown. In this case, the number of reconstruction maps is eight, and the number of data bits transferred is three per sample time, that is, twelve bits over four sampling clock times. The circular image pattern could be altered into a simple linear array of eight image areas and corresponding three bits with a ninth timing area for clocking a sequence of images.

Figure 4:
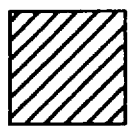
FIG. 4 is a diagram depicting symbolic image coding of data for free space image communication.
Figure 4:
Figure 4:
Figure 4:
Figure 4:
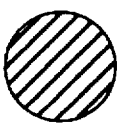
Figure 4:
Figure 4:
Figure 4:
Figure 4:
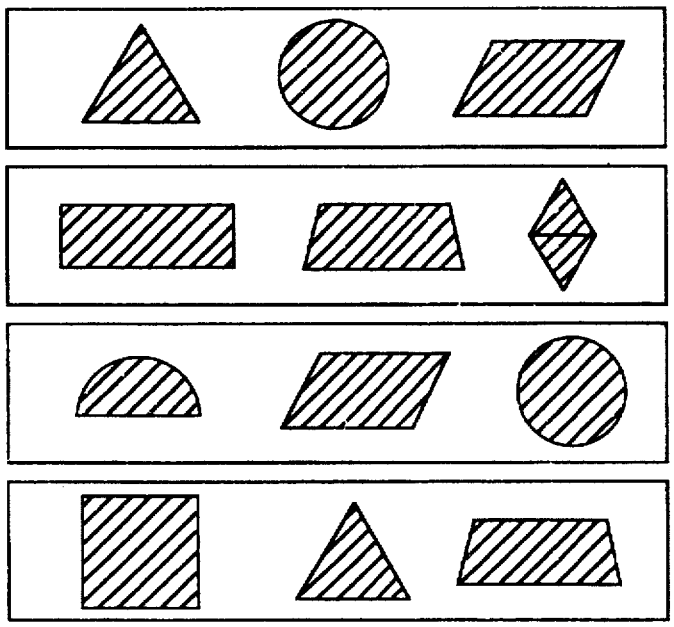

FIG. 4 shows yet another coding scheme referred to as symbolic image coding using symbols including a square, triangle, circle, parallelogram, rhombus, rectangle, trapezoid and semi-circle encoded to bit patterns 000, 001, 010, 011, 100, 101, 110 and 111, respectively. An image can be projected as one or more symbols, for example, three symbols, as shown for each of four image times t0-3. These exemplar images t0-t3 are shown as a triangle, circle and trapezoid for t0, a rectangle, trapezoid and rhombus for t1, a semi-circle, parallelogram and circle for t2, and a square, triangle and trapezoid for t3. The exemplar images t0-t3 are coded as data sets 001010011, 101110100, 111011010 and 000001110, respectively.

FIGS. 2, 3 and 4 show exemplar coding schemes. In each of the examples, the input data set is transformed into a series of one or more pictures, that is, images communicated between the transmitter 10 and receiver 12. The receiver 12 decodes 22 the images back into the data set 24. The communication of the images can be to a plurality of receivers, only one receiver 12 being shown for simplicity. The receivers 12 would each have a respective receiving camera 20 receiving the transmitted image pattern at the same time. The receiver 12 receives 20 and decodes 22 the image pattern into a corresponding digital output data set 24 as a data stream as the images are communicated from the transmitter 10 to the receiver 12. The transmitted images are preferably two dimensional images enabling high data transfer rate.

Several timing protocols may be used for sending or receiving data. One technique is to send the data synchronously, using synchronized clocks in both the transmitter 10 and receiver 12. A second technique is for the transmitter 10 to send the data and the receiver 12 to echo back to the transmitter 10 what was sent. If no fault occurred a new image is sent. If a fault did occur, the data may be re-transmitted. A third technique is to embed in the transmitted display in a sequence number of the numbers of images sent. The receiver checks for the right sequence number, and if incorrect a fault is detected. Another method includes self-clocking images which include timing information such as those used in asynchronous communication of a packet of images each of which is synchronous respecting each other in a sequence of images in the packet. The clocking techniques may include the frequency modulation timing methods commonly used in computer disk drives.

The data is preferably transferred dimensionally, that is, within an array of pixels in one or two dimensions of the image. Enhancements may include the use of color within the image to increase the data rates. Another enhancement is the use of variable amplitude intensity, such as a gray scale where the signal strength within each pixel or groups of pixels is variable for increased data compaction into a single image. These encoding enhancements may further increase data transfer rates. No wires or critical alignment between the transmitter 10 and receiver 12 are needed. Further, multiple receivers 12 can simultaneously view the same displayed image from different angles thereby enabling the distribution of the displayed image and the encoded data therein, to multiple reception points. The data in the displayed image can be encrypted using algorithms that take advantage of the multidimensional features of the transmitter 10 and receiver 12. The process of transmitting data can be further enhanced using conventional pattern recognition and data compression techniques. Pattern recognition technique include the ability for the receiver 12 to learn what is being sent by correlating received images to known images and known data patterns.

In the application of umbilical connection, the launch vehicle could encode 16 an input data set 14 and display image data on a flat panel display 18, such as a field emission display. A ground video camera 20 receives the display and decodes 22 the image into the output data set 24 for free space communication without the use of an umbilical cable. With zoom capability, the camera 20 could be place at a remote distance from the display 18. Other applications include the elimination of data cables in electronic boxes in spacecraft, launch vehicles, and between computer systems.

The implement depends on the application requirements such as distance between transmitter 10 and receiver 12, required data rates, and functional capability. One implementation is to input 4 bits of data to be transmitted into a display decoder such as a Hewlett-Packard 5082-7340 Hexadecimal and Numeric Display. The display is a 4 by 7 dot matrix array of the numerals 0 to 9 or letters A to F representing the alphanumeric hexadecimal representation of a 4 bit pattern. An array of 28 photodetectors such as those produced by Motorola is focused on a specific respective dot to detect the presence of a respective lit dot within the matrix. The resulting detected dot pattern output is entered into combinational logic circuits to generate a corresponding bit pattern. An exemplar binary pattern is 1110, the hexadecimal symbol E. The photodiodes detect the lit dots for the symbol E and provides binary signals to the logic having four outputs. If the E symbol is displayed on the dot matrix and then detected, the 1110 output is presented representing the symbol E. In a similar fashion all other hexadecimal symbols are displayed detected and the appropriate hexadecimal pattern is generated. An alternate implementation is to use a microcomputer instead of the combinational logic circuits. All 28 matrix dot representations are entered into the computer memory and a stored algorithm inspects the dot patterns to determine the binary representation, e.g., 1110.

A more versatile implementation is to store the input binary data to be transmitted into a microcomputer memory. The microcomputer uses the stored data to generate an image. This image could be a two dimensional pixel pattern stored in a 640 by 480 bit RAM. The video display 18, such as the 640 by 480 pixel personal computer video monitor, receives the image stored in RAM and displays the image. The receiver camera 20 is focused on the video monitor 18 showing displayed image. The camera 20 detects the image pixels and the digitized pixels are stored in RAM. The receiver microcomputer using pattern recognition techniques examines the stored data and generates 22 an output binary data stream that corresponds to the input data stream of the transmitter 10.

Many suitable implementations are also possible in terms of microcomputers, displays, video cameras, packaging, protocols, encoding patterns, decoding correlations, compression technologies, pattern recognition, reflected transmission paths, multiple transmission paths, redirected transmission and suitable software algorithms. The preferred form of the invention may be improved, enhanced and modified. However, those enhancements, improvements and modifications may nonetheless fall within the spirit and scope of the following claims.

What is claimed is:

1. A system for communicating a data set through free space, the system comprising,
   a encoding means for encoding the data set into an pixelized image,
   a display means for converting the pixelized image into a displayed image and projecting the displayed image through free space,
   a camera means for receiving the display image and converting the displayed image into the pixelized image, and
   a decoding means for decoding the pixelized image into a data set.

2. The system of claim 1 wherein the encoding means is a microcomputer comprising a programmed microprocessor for executing programs and a memory for storing image patterns, the encoding means receives the data set and matches the data set to one of the image patterns to generate the pixelized image communicated to the display means.

3. The system of claim 1 wherein the display means comprises an illumination means for receiving the pixelized image and converting the pixelized image into the display image, and a projection means for projecting the displayed image towards the camera means through free space.

4. The system of claim 1 wherein the camera means comprises a focusing means for receiving and focusing the displayed image transmitted from the display means, and a photodetecting means for receiving the displayed image from the focusing means and for converting the displayed imaged into the pixelized image communicated to the decoding means.

5. The system of claim 1 wherein the decoding means is a microcomputer comprising a programmed microprocessor for executing programs and a memory for storing image patterns, the microcomputer is programmed to match the pixelized image to one of the image patterns to generate the data set.

6. The system of claim 1 wherein
   the encoding means is a microcomputer comprising a programmed microprocessor for executing programs and a memory for storing image patterns, the encoding means receives the data set and matches the data set to one of the image patterns to generate the pixelized image communicated to the display means,
   the display means comprises an illumination means for receiving the pixelized image and converting the pixelized image into the display image, and a projection means and for projecting a display image towards the camera means through free space,
   the camera means comprises a focusing means for receiving and focusing the displayed image transmitted from the display means, and a photodetecting means for receiving the displayed image from the focusing means and for converting the displayed imaged into the pixelized image communicated to the decoding means, and
   the decoding means is a microcomputer comprising a programmed microprocessor for executing programs and a memory for storing the image patterns, the microcomputer is programmed to match the pixelized image to one of the image patterns to generate the data set.

7. The system of claim 6 wherein the image patterns are hexadecimal image patterns each respectively coded to one a plurality of data sets.

8. The system of claim 6 wherein the image patterns are angular image patterns each respectively coded to one a plurality of data sets.

9. The system of claim 6 wherein the image patterns are symbolic image patterns each respectively coded to one a plurality of data sets.

10. A method of communicating a data set through free space, the method comprising the steps of
    encoding the data set into a pixelized image,
    converting the pixelized image into a display image,
    projecting the display image through free space,
    receiving the display image,
    focusing the display image,
    photodetecting the display image, converting the display image into the pixelized image, and decoding pixelized image into the data set.

11. The method of claim 10 further comprising the steps of storing image patterns before the encoding step, the encoding step is by matching the data set to one of the image patterns and generating the pixelized image.

12. The method of claim 10 further comprising the steps of storing image patterns before the decoding step, the decoding step is by matching pixelized data set to one of the image patterns and generating the data set.

13. The method of claim 10 wherein the encoding step encodes one or more bits of the data set to a respective area of the pixelized image, and the decoding steps decode the respective area of the pixelized image into one or more bits.

14. The method of claim 10 further comprising the steps of storing image patterns before the encoding step, the encoding step is by matching the data set to one of the image patterns and generating the pixelized image, and storing image patterns before the decoding step, the decoding step is by matching pixelized data set to one of the image patterns and generating the data set.

15. The method of claim 14 wherein the image patterns are hexadecimal image patterns each respectively coded to one a plurality of data sets.

16. The method of claim 14 wherein the image patterns are angular image patterns each respectively coded to one a plurality of data sets.

17. The method of claim 14 wherein the image patterns are symbolic image patterns each respectively coded to one a plurality of data sets.

* * * * *